United States Patent
Keller

[11] Patent Number: 5,284,013
[45] Date of Patent: Feb. 8, 1994

[54] GAS TURBINE ARRANGEMENT

[75] Inventor: Jakob Keller, Dottikon, Switzerland

[73] Assignee: Asea Brown Boveri Ltd., Baden, Switzerland

[21] Appl. No.: 757,192

[22] Filed: Sep. 10, 1991

[30] Foreign Application Priority Data

Sep. 10, 1990 [EP] European Pat. Off. ......... 90117375.7

[51] Int. Cl.⁵ .............................................. F02C 3/02
[52] U.S. Cl. .................................... 60/39.45; 60/39.55
[58] Field of Search ............ 60/39.45 A, 39.53, 39.55; 417/64

[56] References Cited

U.S. PATENT DOCUMENTS

| | | | |
|---|---|---|---|
| 872,806 | 12/1907 | DeFerranti | 60/39.55 |
| 2,467,186 | 2/1949 | Seippel | 60/39.45 A |
| 2,738,123 | 3/1956 | Hussmann | 60/39.45 A |
| 3,003,315 | 10/1961 | Spalding | |
| 3,398,525 | 8/1968 | Jenny | 60/39.45 A |
| 4,397,356 | 8/1983 | Retallick | 60/39.55 |
| 4,425,755 | 7/1984 | Hughes | 60/39.55 |
| 4,679,393 | 7/1987 | Hellat et al. | 60/39.45 A |
| 4,719,746 | 7/1988 | Keller | 60/39.45 A |
| 5,088,450 | 2/1992 | Sternfeld et al. | 60/39.55 |

FOREIGN PATENT DOCUMENTS

| | | |
|---|---|---|
| 0179233 | 4/1986 | European Pat. Off. . |
| 928857 | 11/1954 | Fed. Rep. of Germany . |
| 1102490 | 3/1961 | Fed. Rep. of Germany . |
| 1626523 | 6/1970 | Fed. Rep. of Germany . |
| 348577 | 10/1960 | Switzerland . |

Primary Examiner—Richard A. Bertsch
Assistant Examiner—Michael I. Kocharov
Attorney, Agent, or Firm—Oblon, Spivak, McClelland, Maier & Neustadt

[57] ABSTRACT

This gas turbine arrangement has an at least two-stage gas turbine (1) with a main combustion chamber (10) and a compressor (5). An energy exchanger (8) which interacts with the separate combustion chamber (14) is installed upstream of the gas turbine (1). The efficiency of the gas turbine arrangement is to be increased by simple means. In order to achieve this, the separate combustion chamber (14) is designed as an afterburner chamber for a part of the gases generated in the main combustion chamber (10). In addition, means for the additional injection of a liquid or vapor medium are provided in the region of the combustion chamber (14). The volume flow in the energy exchanger (8) and hence the efficiency of the gas turbine arrangement are increased by this injection.

9 Claims, 2 Drawing Sheets

GAS TURBINE ARRANGEMENT

BACKGROUND OF THE INVENTION

1. Field of the Invention

The invention is based on a gas turbine arrangement in accordance with the preamble to claim 1. Such a gas turbine arrangement has a compressor for the combustion air and a two-stage gas turbine. A pressure wave machine used as an energy exchanger is installed upstream of the gas turbine.

2. Discussion of Background

A gas turbine arrangement of the type mentioned at the beginning is known, for example, from EP-0 179 233 B1. In this gas turbine arrangement, an energy exchanger is installed upstream of the gas turbine and this energy exchanger brings combustion air, which has been previously compressed in a low pressure compressor, to an even higher pressure level. Upstream of the energy exchanger, there is a combustion chamber which is operated with gas or oil as fuel and whose combustion air is branched off after the energy exchanger from a high pressure duct for the supercharged air at the higher pressure level. The high pressure duct guides the main part of the supercharged air into a main combustion chamber in which the gas or oil is burned, together with this air, to produce driving gas at high pressure and high temperature. This driving gas is fed into and drives the high pressure part of the gas turbine. The somewhat cooled and somewhat expanded gases, which have given up a part of their energy in the energy exchanger to supercharge the combustion air, are, when they emerge, introduced into a second stage of the gas turbine where they are mixed with the driving gas expanded in the high pressure part and, together with the latter, also drive the gas turbine.

In this gas turbine arrangement, the energy exchanger s driven at a relatively low operating temperature. An additional increase in the efficiency of the arrangement would be possible at higher operating temperatures.

SUMMARY OF THE INVENTION

Accordingly, one object of this invention is to provide a novel gas turbine arrangement in which increased efficiency is achieved by simple means.

The advantages achieved by means of the invention are mainly to be seen in the fact that the volume flow into the gas turbine is substantially increased by the injection of water or steam without the combustion behavior of the main combustion chamber being negatively affected by it. It is also found that the energy gain of this gas turbine arrangement takes place approximating to the Carnot process. It is found particularly advantageous that despite the relatively very high combustion temperatures in the separate burner, the $NO_x$ formation is of practically no importance so that overall, less $NO_x$ is generated compared with comparable arrangements.

The further embodiments of the invention are the subject-matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
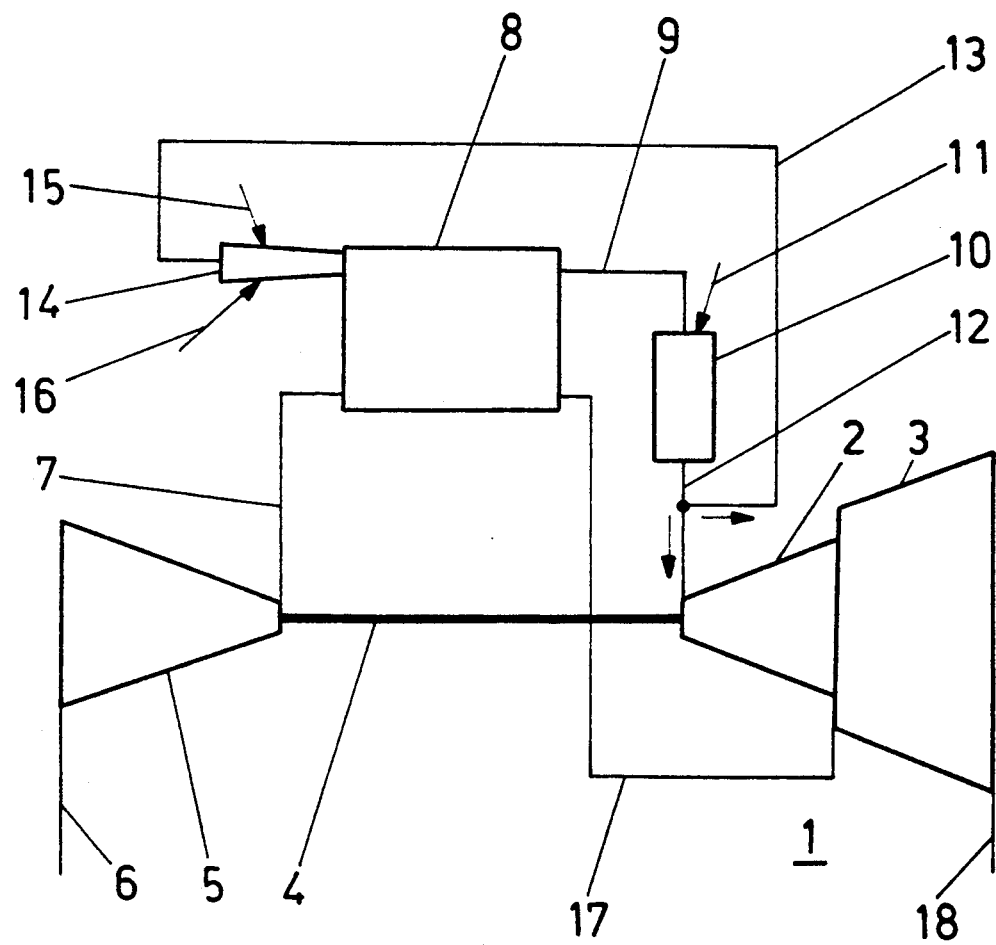
FIG. 1 shows a diagrammatic sketch of a gas turbine arrangement.

Referring now to the drawings, wherein like reference numerals designate identical or corresponding parts throughout the several views, in FIG. 1 a diagrammatic sketch of a gas turbine arrangement in accordance with the invention is shown. A gas turbine 1 with a first stage 2 and a second stage 3 acts via a shaft 4 on a compressor 5. This first stage 2 can be designed as a separate high pressure turbine and can drive a separate generator for generating electrical energy. Air flows through a conduit 6 into the compressor 5 and is compressed. The compressed air flows through a conduit 7 from the compressor 5 into an energy exchanger 8. The supercharged air from the energy exchanger 8 is guided through a conduit 9 into a main combustion chamber 10. An arrow 11 indicates that fuel, in fact oil or gas, is supplied to the main combustion chamber 10. The high pressure driving gas produced in the main combustion chamber 10 is introduced through a conduit 12 into the first stage 2 of the gas turbine. A conduit 13 branches off from the conduit 12 and leads to a separate combustion chamber 14. A fuel such as oil or gas is burned in this combustion chamber 14, as indicated by an arrow 15. In addition, a fluid such as water or steam is also injected in the region of this combustion chamber 14, as indicated by an arrow 16. The driving gas produced flows into the energy exchanger 8 located immediately after this combustion chamber 14 and leaves the energy exchanger through a conduit 17. The conduit 17 leads to the second stage 3 of the gas turbine 1. The expanded gas leaves the gas turbine 1 through a conduit 18. It is, however, possible for further gas turbine stages to follow the second stage 3. It is also possible for the conduit 18 to lead into a heat exchanger where further useful heat energy can be extracted from the expanded gas.

Figure 2:
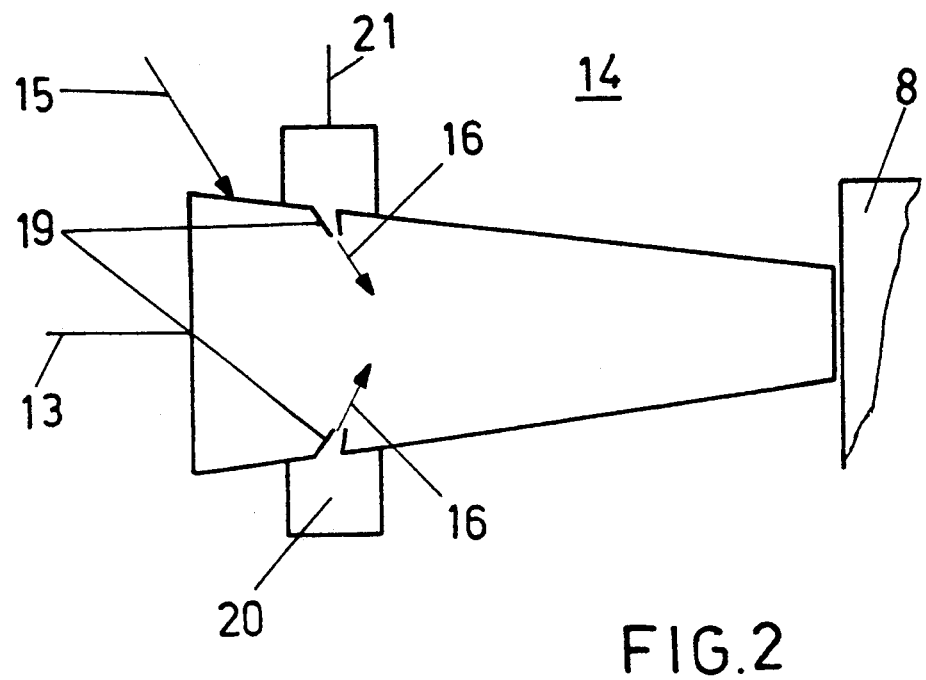
FIG. 2 shows a diagrammatic sketch of a first combustion chamber.

FIG. 2 shows a diagrammatic sketch of one embodiment of the separate combustion chamber 14, whose structure is rotationally symmetrical about a central axis. The actual burner is not shown and the arrow 15 only indicates the supply of fuel. The combustion chamber 14 is surrounded by an annular chamber 20, which is provided with nozzles 19 and into which water or steam is fed through a conduit 21. The water or steam is injected into the combustion chamber 14 through the nozzles 19, as indicated by the arrow 16.

Figure 3:
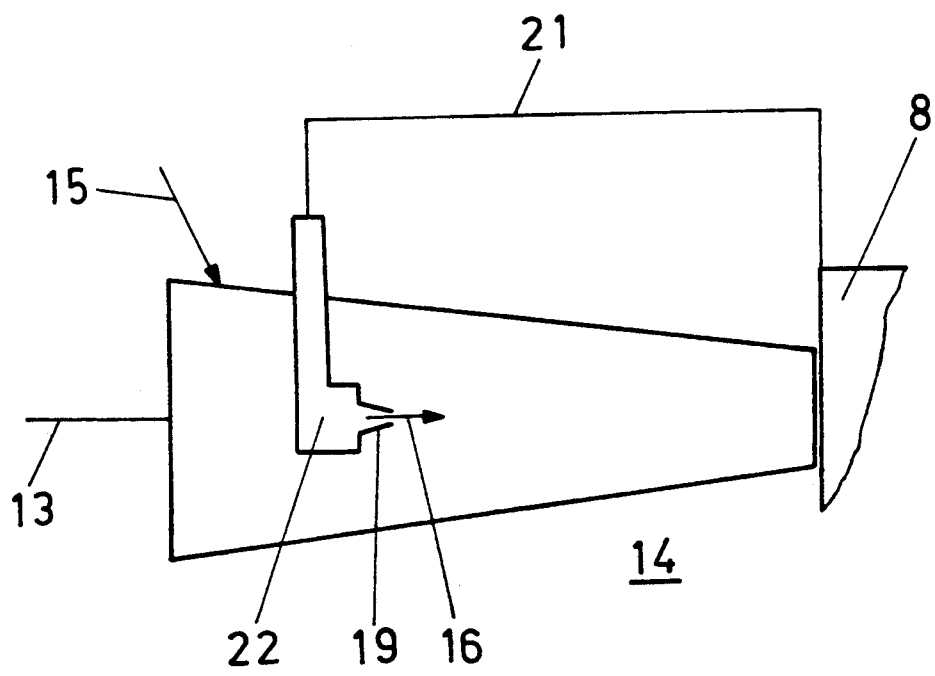
FIG. 3 shows a diagrammatic sketch of a second combustion chamber.

FIG. 3 shows a diagrammatic sketch of a further embodiment of the separate combustion chamber 14. In this embodiment, the water or steam is fed by a lance 22 into the center of the combustion chamber 14 and is there injected through a nozzle 16, which is designed as a spray nozzle but which can also be composed of a plurality of nozzles. In this case, the conduit 21 feeds cooling water or steam, with which parts of the gas turbine arrangement, for example the parts of the energy exchanger 8, have been cooled, to the lance 22.

For an explanation of the mode of operation, FIG. 1 should first be considered in more detail. Air is compressed in the compressor 5 and flows from there through the conduit 7 into the energy exchanger 8 where it is further compressed. The energy exchanger 8 is designed as a pressure wave machine and its mode of operation is assumed to be known, it can have a single-stage or multi-stage design. The energy exchanger 8 is preferably driven by gases flowing in and out but it is also possible to drive it from the gas turbine 1 or to provide it with a separate drive. The supercharged air at a higher pressure level leaves the energy exchanger 8 through the conduit 9 and flows into the main combustion chamber 10. In the main combustion chamber 10 an above-stoichiometric combustion takes place and part of the driving gas produced by this means, which is at high pressure, is fed through the conduit 12 into the first stage 2, the high pressure stage of the gas turbine 1, and drives the latter.

Part of the driving gas at high pressure is branched off from the conduit 12 into the conduit 13. This branching system can be designed in such a way that the same proportion is always branched off but it is also possible to make the branching system controllable (as schematically indicated at 12a in FIG. 1) so that the quantity branched off can, for example, be changed as a function of the operating condition of the complete gas turbine arrangement. Generally speaking, the largest possible quantity of the driving gas produced is diverted through the conduit 13 into the separate combustion chamber 14 because this path via the energy exchanger 8 permits better utilization of the energy of the driving gas and hence an advantageous increase in efficiency for this quantity of driving gas.

The driving gas still has a sufficient proportion of air to act in the combustion chamber 14 as combustion air for the fuel fed into the combustion chamber 14. The combustion chamber 14 therefore acts as a sort of afterburner. The temperature and the pressure of the driving gas are again increased. Such high temperatures are only possible because the combustion chamber 14 is immediately followed by the rotating energy exchanger 8 which, because of the energy exchange processes taking place there, adjusts only to an average temperature and not to the full temperature of the driving gases entering. In this way, the high energy content of the hot driving gases can be advantageously exploited but without these high temperatures endangering the strength of the materials subjected to them. In addition, the high temperatures after the combustion chamber 14 cause no worthwhile formation of $NO_x$ because the driving gases pass through this area very rapidly.

Water or steam is also injected in the region of the combustion chamber 14 and mixed with the hot driving gas. This leads to the water or the steam being superheated and is therefore associated with an increase in the volume flow leaving the combustion chamber 14. The kinetic energy of this volume flow is used in the energy exchanger 8 to bring the air, which has previously been compressed in the compressor 5, to the higher pressure level. The very hot gas mixture forming the volume flow is fed, after it has expanded in the energy exchanger 8, through the conduit 17 into the second stage 3 of the gas turbine 1. While it is being fed in, it is mixed with the driving gas leaving the first stage 2, which gas has approximately the same temperature and the same pressure. The utilization of the residual energy of the driving gas and that of the gas mixture takes place in this case in the second stage 3 but it is possible to provide still further stages, depending on the operating concept of the gas turbine arrangement.

Tests have shown that the injection of a liquid or vapor medium and mixing with the hot driving gas introduces a substantial increase in the power of the arrangement. The reason for this may be seen in the fact that it is only the volume flow of the mixture entering the energy exchanger 8 which has a critical effect on the energy supplied to the previously compressed air which has to be further supercharged; neither the temperature of the mixture nor its mass flow have any influence on the pressure wave supercharging process. The increase in the volume flow by means of the injection described therefore has a very advantageous effect even though the mixing process is associated with a substantial increase in entropy. Also of decisive importance in this type of injection is the fact that the combustion behavior of the combustion chamber 10 cannot be negatively affected by any reactions to the injection. The injection can therefore be controlled quite independently of the operating condition of the main combustion chamber 10. No such injection is provided for the main combustion chamber 10.

The nozzles 19, which are arranged as shown in FIG. 2, have axes which intersect at a common point on the central axis of the combustion chamber 14. The inclination of the nozzles can be set in such a way that optimum mixture formation is ensured. By means of auxiliary nozzles, it is also possible to permit part of the water or steam to enter along the wall of the combustion chamber 14 so that this wall is protected from excessive thermal effects.

Particularly thorough mixture formation is achieved by means of the lance 22, as shown in FIG. 3. It is also possible to employ a combination of the nozzle arrangements of FIG. 2 and FIG. 3. Water or steam used for cooling the energy exchanger 8 can, as indicated by the conduit 21, be advantageously used for injection into the combustion chamber 14 because this avoids an excessive temperature difference between the driving gas and the water or steam and therefore avoids the associated thermal shock. It is also possible to use water or steam which has cooled other parts of the gas turbine arrangement for this injection. In addition, it is sensible to combine the compressor 5, the gas turbine 1 and the energy exchanger 8 into a compact unit in the most confined space in order to avoid energy losses due to thermal radiation. A further and economically particularly favorable type of design of the gas turbine arrangement appears when the compressor 4 is omitted and a multi-stage energy exchanger 8 is used instead.

Obviously, numerous modifications and variations of the present invention are possible in light of the above teachings. It is therefore to be understood that within the scope of the appended claims, the invention may be practiced otherwise than as specifically described herein.

I claim:

1. A gas turbine arrangement with at least one gas turbine with at least two stages, having at least one compressor driven by the gas turbine, and having a main combustion chamber and at least one energy exchanger interacting with a separate combustion chamber, which energy exchanger is installed upstream of the gas turbine, wherein the separate combustion chamber receives a part of the gases generated in the main combustion chamber and is designed as an afterburner chamber for said part of the gases generated in the main combustion chamber;

injection means for the additional injection of at least one of a liquid and a vapor medium are provided in the region of the separate combustion chamber;

the arrangement further including:

a first conduit or providing air at a high pressure level from the energy exchanger to be fed into the main combustion chamber;

a second conduit for feeding driving gas produced in the main combustion chamber into the separate combustion chamber;

a third conduit for feeding driving gas produced in the main combustion chamber to a first stage of the gas turbine;

wherein the separate combustion chamber is located immediately upstream of the energy exchanger at an inlet of the energy exchanger; and wherein hot gas emerging from the energy exchanger is fed through a fourth conduit into a second stage of the gas turbine.

2. Gas turbine arrangement as claimed in claim 1, further including:

means for controlling the injection of the at least one of a liquid and a vapor medium independently of an operating condition of the main combustion chamber.

3. Gas turbine arrangement as claimed in one of claims 1 or 2 wherein at least one of water and water vapor is provided as the respective at least one of a liquid and vapor medium.

4. Gas turbine arrangement as claimed in claim 3, wherein the at least one of water and water vapor is used at least in part for cooling at least part of the gas turbine arrangement before injection into the separate combustion chamber.

5. Gas turbine arrangement as claimed in claim 1, wherein the structure of the separate combustion chamber is rotationally symmetrical about a central axis, nozzles arranged on a ring are provided as means for the injection, which nozzles each have a nozzle axis intersecting the central axis at a common point, and the position of the common point is optimized with respect to the full load operation of the separate combustion chamber.

6. Gas turbine arrangement as claimed in claim 1, wherein a lance with at least one nozzle is provided in a center of the separate combustion chamber as the means for the injection.

7. Gas turbine arrangement with at least one gas turbine with at least two stages, having at least one compressor driven by the gas turbine, having a main combustion chamber and at least one energy exchanger interacting with a separate combustion chamber, which energy exchanger is installed upstream of the gas turbine; wherein the separate combustion chamber receives a pair of the gases generated in the main combustion chamber and is designed as an afterburner chamber for said part of the gases generated in the main combustion chamber;

injection means for the additional injection of at least one of a liquid and a vapor medium are provided in the region of the separate combustion chamber;

the arrangement further including a first conduit for feeding driving gas produced in the main combustion chamber to a first stage of the gas turbine and a second conduit for feeding driving gas produced in the main combustion chamber into the separate combustion chamber such that a portion of said driving gas is fed from said main combustion chamber and driving gas which does not flow through said second conduit is fed to the first stage of the gas turbine through said first conduit; and driving gas control means for controlling the driving gas quantity led off through the second conduit provided downstream of the main combustion chamber.

8. Gas turbine arrangement as claimed in claim 1, wherein the energy exchanger is of at least two-stage design.

9. The gas turbine arrangement of claim 7, wherein said separate combustion chamber is provided immediately upstream of said at least one energy exchanger at an inlet of said at least one energy exchanger.

* * * * *